United States Patent [19]

Portner

[11] Patent Number: 4,722,286

[45] Date of Patent: Feb. 2, 1988

[54] OVEN WITH MEANS TO ESTABLISH A UNIFORM TEMPERATURE PROFILE

[76] Inventor: Walter R. Portner, 420 Miriam Ave., Leesport, Pa. 19533

[21] Appl. No.: 900,438

[22] Filed: Aug. 26, 1986

[51] Int. Cl.$^4$ ............................................. F23G 5/12
[52] U.S. Cl. ..................................... 110/243; 432/14; 432/152; 110/244
[58] Field of Search ................. 110/243, 244, 248; 432/14, 136, 152, 200

[56] References Cited

U.S. PATENT DOCUMENTS

| | | | |
|---|---|---|---|
| 3,580,194 | 5/1971 | Withers | 110/244 |
| 3,616,768 | 11/1971 | Southwick | 110/243 |
| 3,654,881 | 4/1972 | Bowles | 110/244 |
| 3,727,563 | 4/1973 | Hasselbrings et al. | 110/244 |
| 3,817,192 | 6/1974 | Watterback | 110/244 |
| 3,837,813 | 9/1974 | Ebeling et al. | 110/244 |
| 3,887,266 | 6/1975 | Saario | 432/152 |
| 4,278,421 | 7/1981 | Limque et al. | 432/152 |

*Primary Examiner*—Henry C. Yuen
*Attorney, Agent, or Firm*—Leonard M. Quittner

[57] ABSTRACT

An oven is described which is especially adapted to maintain accurate and uniform temperature control. The device of the invention includes a central treatment chamber surrounded by a plenum chamber which, through a number of spaced apart apertures introduces gases at a preselected temperature and elevated pressure into the treatment chamber. The plenum chamber is configured to insure a substantially uniform pressure at each of the apertures to provide a uniform flow of temperature regulated gases through each of the apertures.

5 Claims, 2 Drawing Figures

U.S. Patent
Feb. 2, 1988
4,722,286
FIG. 1
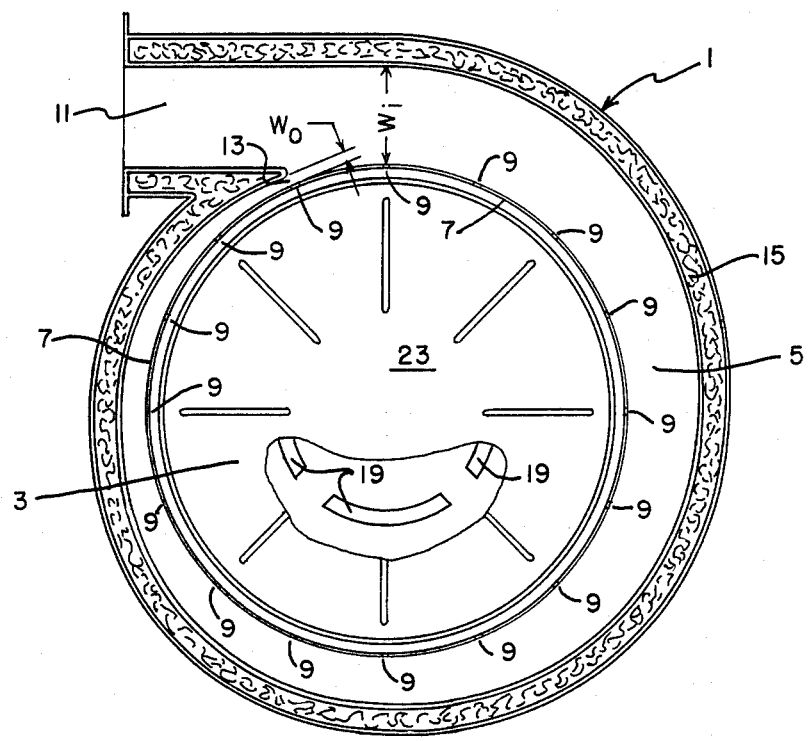
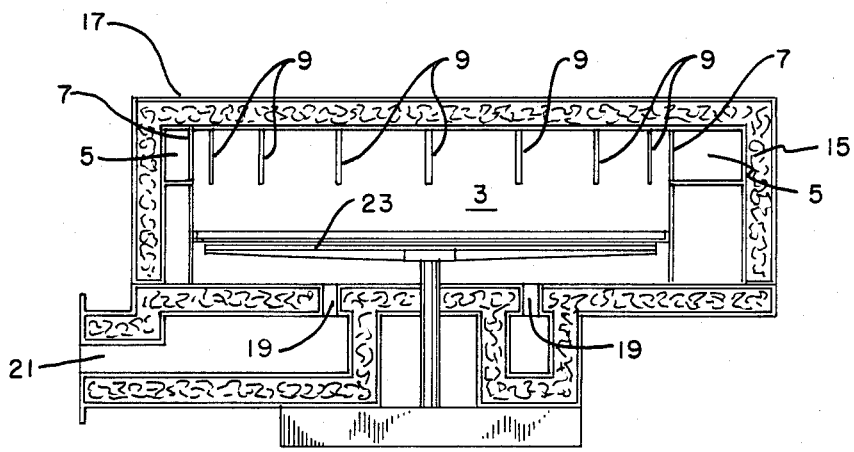
FIG. 2

OVEN WITH MEANS TO ESTABLISH A UNIFORM TEMPERATURE PROFILE

FEDERALLY-SPONSORED RIGHTS

The invention herein was made without any Federal sponsorship or contribution.

CROSS-REFERENCE

There are no cross-reference to, nor are there any related applications.

BACKGROUND OF THE INVENTION

1. Field of the Invention

The field of the invention relates to an improved oven and more particularly to a hot air treatment oven that is capable of maintaining accurately controlled, uniform temperatures throughout the oven.

2. Description of the Prior Art

Many types of hot air ovens are required for domestic and industrial processing in the prior art. These may be used, for example, to bake comestibles, to control reactions, to heat treat materials and for other similar purposes. The reproductibility of the properties of articles treated or made in these ovens may depend largely upon the precision with which the temperature is controlled and the uniformity with which the temperature throughout the ovens is maintained.

SUMMARY OF THE INVENTION

The most common of the treatment ovens of the type with which this invention is concerned are the so-called convection ovens. These ovens depend upon naturally occurring thermal gradients to establish convection currents within the oven that tend to provide a degree of temperature uniformity throughout the ovens. This method of maintaining temperature control is somewhat primitive since the temperature at any given location within the oven is dependent upon the vagaries of thermal currents. Even comparatively small ovens operated at moderate temperatures, for example, a kitchen baking oven, commonly have temperature variations of from 15 to 30 degrees centigrade. Such fluctations become even more exaggerated when articles are placed within the oven which interfere with the free circulation of convection currents depending, to a varying degree, upon the shape, size and positioning of the articles within the oven.

Considerable improvements in the performance of hot air ovens is obtained with forced air circulation. Fans provide a positive circulation of air at higher velocities than result from naturally occurring convection currents and air is circulated with more uniformity even when articles of irregular size and shape are randomly disposed within an oven. However, even convection ovens are not capable of preventing temperature aberrations less than about 5 to 10 degrees centigrade even at moderate temperatures, e.g., below about 250 degrees centigrade. In any instance, the position at which various work pieces are located within the oven may be a matter of major importance in attempting to establish temperature uniformity.

Accordingly, it is an object of this invention to provide a hot air oven that can be maintained at closely controlled and uniform temperatures throughout.

Another object of this invention is to provide a hot air oven that will provide substantially uniform temperatures throughout without regard to the size, shape, or location of work pieces in the oven.

These and other objects are achieved by surrounding the oven treatment chamber with a plenum chamber designed to insure a uniform flow of heated gases into the treatment chamber. Circulation of the heated gases throughout the treatment chamber is insured by exhausting the gases at a midpoint in the chamber and, preferably, recycling the gases after they have been passed through a heat exchanger and their temperature has been reestablished to the desired treatment temperature.

It is to be understood that while the invention is discussed, for purposes of convenience, mostly in the context of an oven for heating purposes, it is just as applicable for cooling purposes, as in the freezing of food. Therefore, any thermal chamber in which it is desired to maintain close temperature control is intended to be within the scope of this invention whether it be used to heat or to cool work pieces.

DESCRIPTION OF THE DRAWINGS

The present invention may be better understood by reference to the drawings wherein two (2) figures are shown on one (1) sheet. The numbers shown on the drawings for the various parts of the invention are consistent throughout so that a number indicating a part in one drawing will indicate the same part in another drawing. FIG. 1 shows a partially cut away sectional view, as seen from above, of a preferred embodiment of this invention.

FIG. 2 is a sectional view, as seen from the side, of the preferred embodiment of the oven of this invention as illustrated in FIG. 1.

DESCRIPTION OF THE PREFERRED EMBODIMENT

The preferred embodiment is described as consisting, in more detail, there is generally illustrated in FIG. 1 an oven (1) comprised of a central treatment chamber (3) by a plenum chamber (5). The treatment chamber (3) and the plenum chamber (5) are separated by a curvilinear partition (7) which is here shown as circular and serves as the outside wall of the treatment chamber (3) and the inside wall of the plenum chamber (5). The partition (7) contains a number of apertures (9) which provide open communication between the plenum chamber (5) and the treatment chamber (3). The plenum chamber (5) is adapted to receive gases at a gas receiving port (11) and exhaust them, at a gas discharging port (13). The plenum chamber (5) has a radially outward insulated wall (15) which spirals inwardly from the gas receiving (inlet) port (11) to the gas discharging (outlet) port (13). As can be seen in the drawings, the spiral of the outside wall (15) provides a width (Wi) adjacent the gas receiving port (11) and a width (Wo) adjacent the gas discharging port (13).

FIG. 2 shows an insulated cover (17) which may be raised and lowered, by means not shown, to provide access to the treatment chamber (3) to put in and take out work pieces. Circulating gases are exhausted from the interior of the treatment chamber (3) through centrally located exhaust ports (19) which, in turn, communicate with exhaust conduit (21).

A work table (23) is located within the treatment chamber to support work pieces. As here illustrated, the work table (23) is mounted for rotation which can, if desired, be spun to provide centifugal forces for rotational or centrifugal casting of work pieces undergoing treatment in chamber (3).

In operation, the cover (17) is lifted and work pieces are positioned on the work table (23). The cover (17) is then closed and air at elevated pressure, which has been heated or cooled to a desired treatment temperature is introduced into the gas receiving port (1). The elevated pressure of the temperature regulated gases, causes the gases to move (as here illustrated) in a clockwise direction through the plenum chamber (5) toward the small gas outlet port (13). Some of the gases passing through the plenum chamber will be exhausted sequentially at each of the several apertures (9). The spiral in the outside wall (15) is designed to reduce the cross sectional area of the plenum chamber (5) in proportion to the volume of the gases that are exhausted through the upstream apertures (9). By these means, the pressure of the gases is maintained with substantial uniformity in their passage around the plenum chamber (5). This means that when the apertures (9) are all of uniform cross sectional area, the pressure drop and the volume of the gases flowing through each aperture (9) will be the same. Stated somewhat more simply, the cross sectional area of the plenum chamber is designed to maintain the circulating gases at a uniform pressure and compensate for that portion of the gases that is exhausted through the upstream apertures provided only that they all be of uniform cross sectional area.

As here illustrated the total area of the apertures (9) approximately equals the reduction in the volume of the plenum chamber (5) from the gas receiving port (11) to the gas discharging port (13), which is proportional to Wi-Wo. when, as here, the area of each of the apertures (9) is equal, the reduction in the cross sectional area of the plenum chamber (5) around its entire periphery should approximate the summation of the cross sectional area of all of the apertures (9). When this is true, and if the apertures are evenly spaced, the cross sectional area of the plenum chamber (5) at any given point "x" moving clockwise around the spiral will be in inverse linear proportion to the angular displacement of the given point "x" from the gas receiving port (11) or $Wx = (360-a)/(360)(W)$ where "W" equals the width of the plenum chamber (5) at its entrance, "Wx" equals the width of the plenum chamber (5) at the given point, and "a" equals the angular displacement of the given point from the entrance to the plenum chamber (5). This assumes, of course, that the height "h" of the plenum chamber (5) is constant and that the cross sectional area "A" at any given point "x" equals $(h)(Wx)$.

As here illustrated, the pressure is maintained substantially uniform due solely to the configuration of the plenum chamber (5). However it is within the scope of this invention to accomplish the same result by other means. For example, the cross section of the plenum chamber (5) could be held substantially uniform but the cross sectional area of the apertures (9) could be varied making them progressively larger from the entrance end to the exit end of the plenum. Also both the area of the plenum and the area of the apertures could be varied to combine the effects of each of them. So too, the cross sectional area of the plenum could be adjusted by varying its height. However, the important matter in the practice of this invention is that the pressure throughout the plenum and the pressure at each of the apertures (9) remains constant to insure an uniform flow of temperature controlled gases at all points as the gases enter the treatment chamber (3).

Also note that for purposes of design it is convenient to provide and outlet port (13) having a width Wo. If desired, Wo could be O.

While not discussed above, it can be understood that the exhaust gases passing through ports (190 and exhaust conduit (21) can be recycled to the inlet (11) after suitable temperature adjustments are made as by passing the exhaust gases through a heat exchange device (not shown).

Since many modifications, variations and changes in detail may be made to the presently described embodiments, it is intended that all matter in the foregoing description and accompanying drawings be interpreted as illustrative and not by way of limitation What claimed is:

1. A treatment device designed to maintain closely controlled temperatures within a confined space comprising:
   a. a cylindrical treatment chamber;
   b. a plenum chamber surrounding substantially the entire circumference of the treatment chamber;
   c. a cylindrical impervious partition between the treatment chamber and the plenum chamber serving both as the outer wall of the treatment chamber and the inner wall of the plenum chamber;
   d. an impervious outer wall of the plenum chamber that is shaped in the form of a segment of a spiral that begins adjacent the partition and spirals outwardly therefrom to surround substantially the entire circumference of the partition;
   e. apertures spaced around the entire circumference of the partition adapted to permit the flow of treatment gases from the plenum chamber into the treatment chamber;
   f. inlet means adapted to permit the introduction of treatment gases into the plenum chamber adjacent the point where the spiraled outer wall is at its maximum radial distance from the circumference of the partition; and
   g. outlet means adapted to permit exhausting treatment gases from the treatment chamber which outlet means are located at a point lying substantially along the center line of the treatment chamber;
   the spiraled outer wall of the plenum chamber being further configured to reduce the cross sectional area of the plenum chamber continuously from the inlet means to the point where the spiraled outer wall is adjacent the partition to provide a reduction in the cross sectional area of the plenum chamber in the direction of the flow of the incoming treatment gases sufficient to insure a substantially uniform flow of treatment gases through each of the apertures spaced around the circumference of the partition.

2. A treatment device according to claim 1 in which the reduction in cross sectional area of the plenum chamber is a linear function of the distance, measured on the circumference of the partition, of any given point on the circumference of the partition from the inlet means.

3. A treatment device according to claim 2 in which the cross sectional area of each of the aperatures is approximately the same.

4. A treatment device according to claim 1 in which the cross sectional area of the plenum chamber at any given point is equal to the cross sectional area of the plenum chamber at the inlet means multipled by the fraction (360−a)/360 in which "a" is the angular displacement of the point from the inlet means.

5. A treatment device according to claim 1 in which the cross sectional area of each of the aperatures is approximately the dividend of the difference between the cross sectional area of the plenum chamber at the inlet means and the cross sectional area of the plenum chamber where the spiraled outer wall is adjacent the partition divided by the number of aperatures.

* * * * *